A. BENZ, Jr.
APPARATUS FOR TREATMENT OF DOUGH.
APPLICATION FILED JUNE 16, 1920. RENEWED JAN. 16, 1922.
1,430,616.
Patented Oct. 3, 1922.
4 SHEETS—SHEET 4.
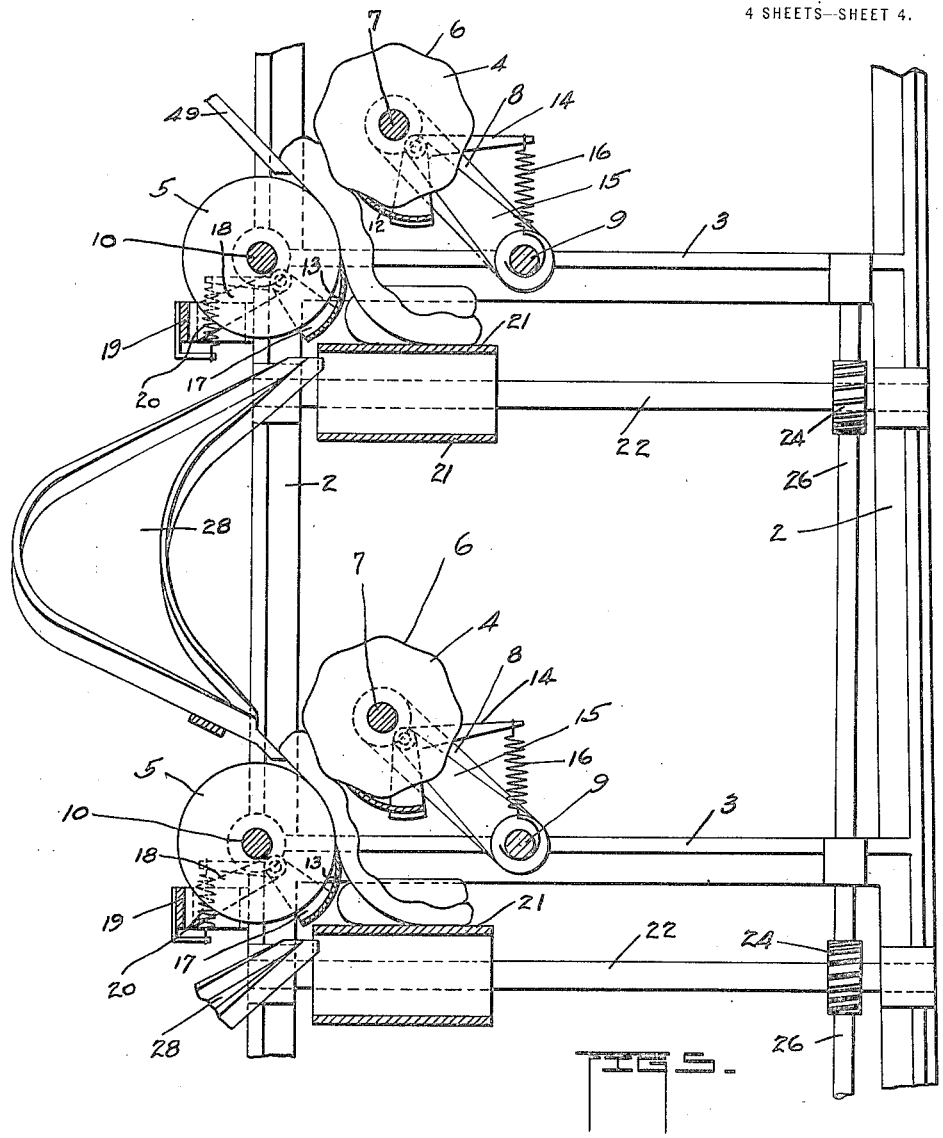
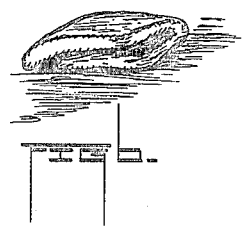
INVENTOR Patented Oct. 3, 1922.

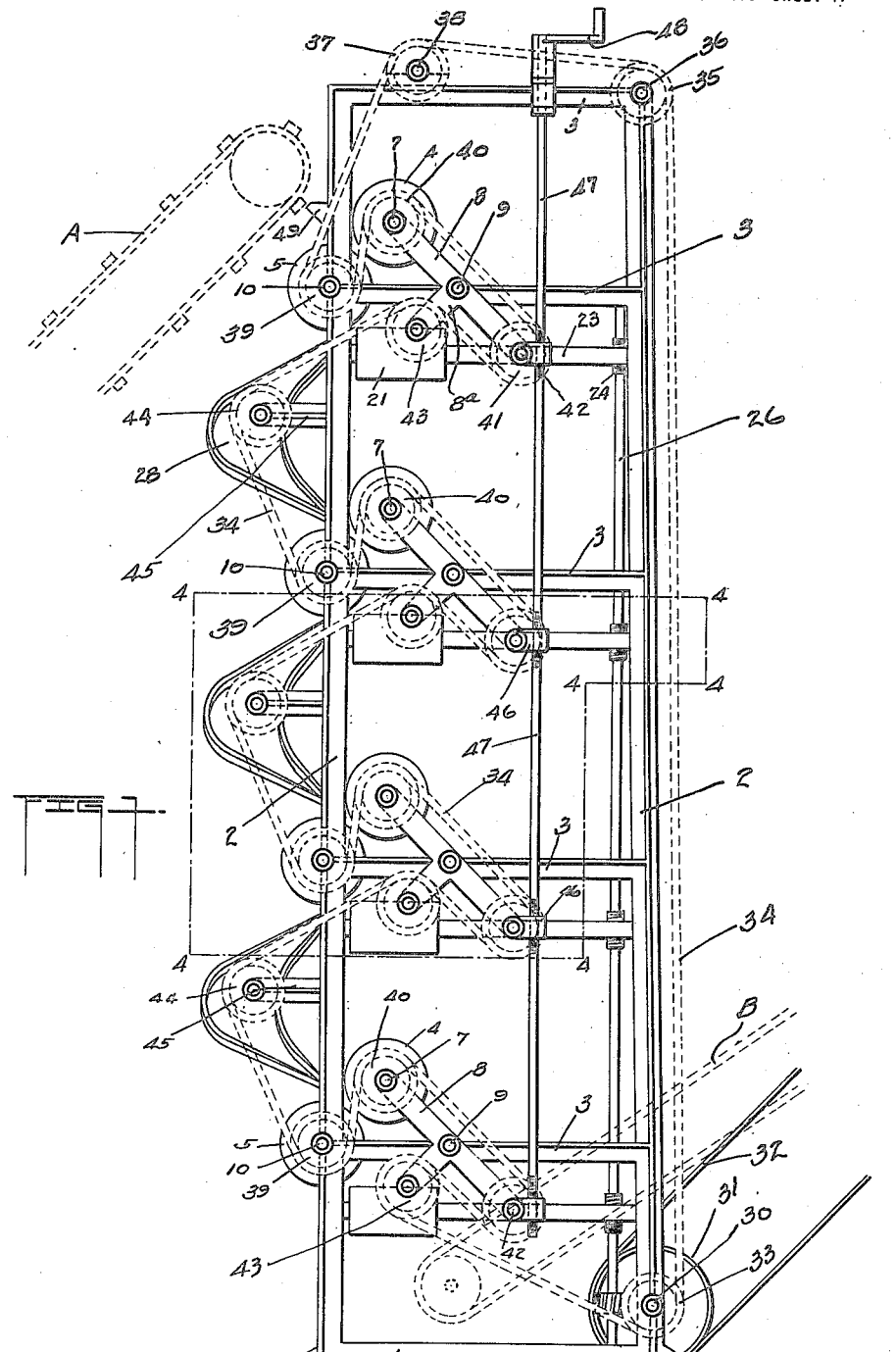

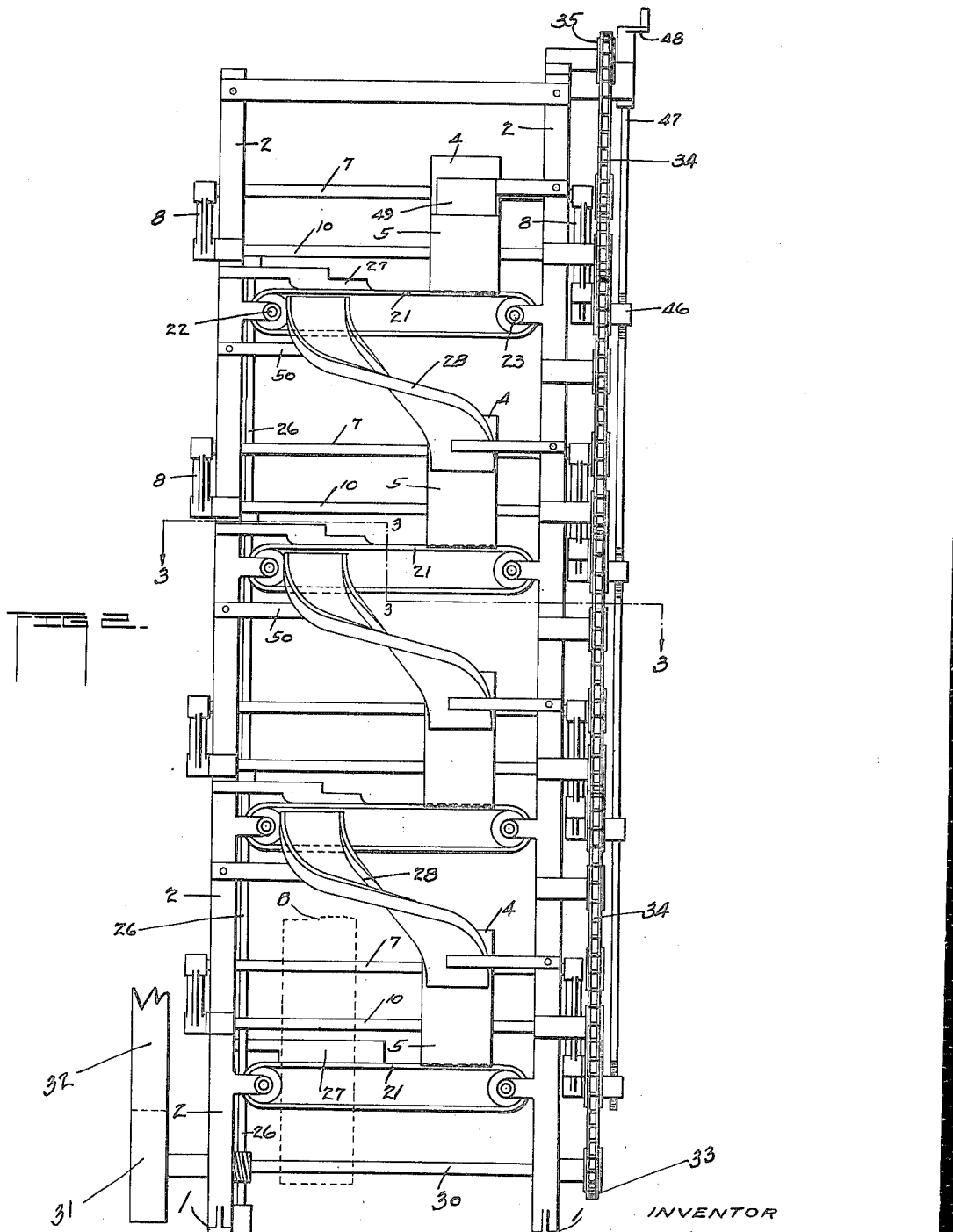

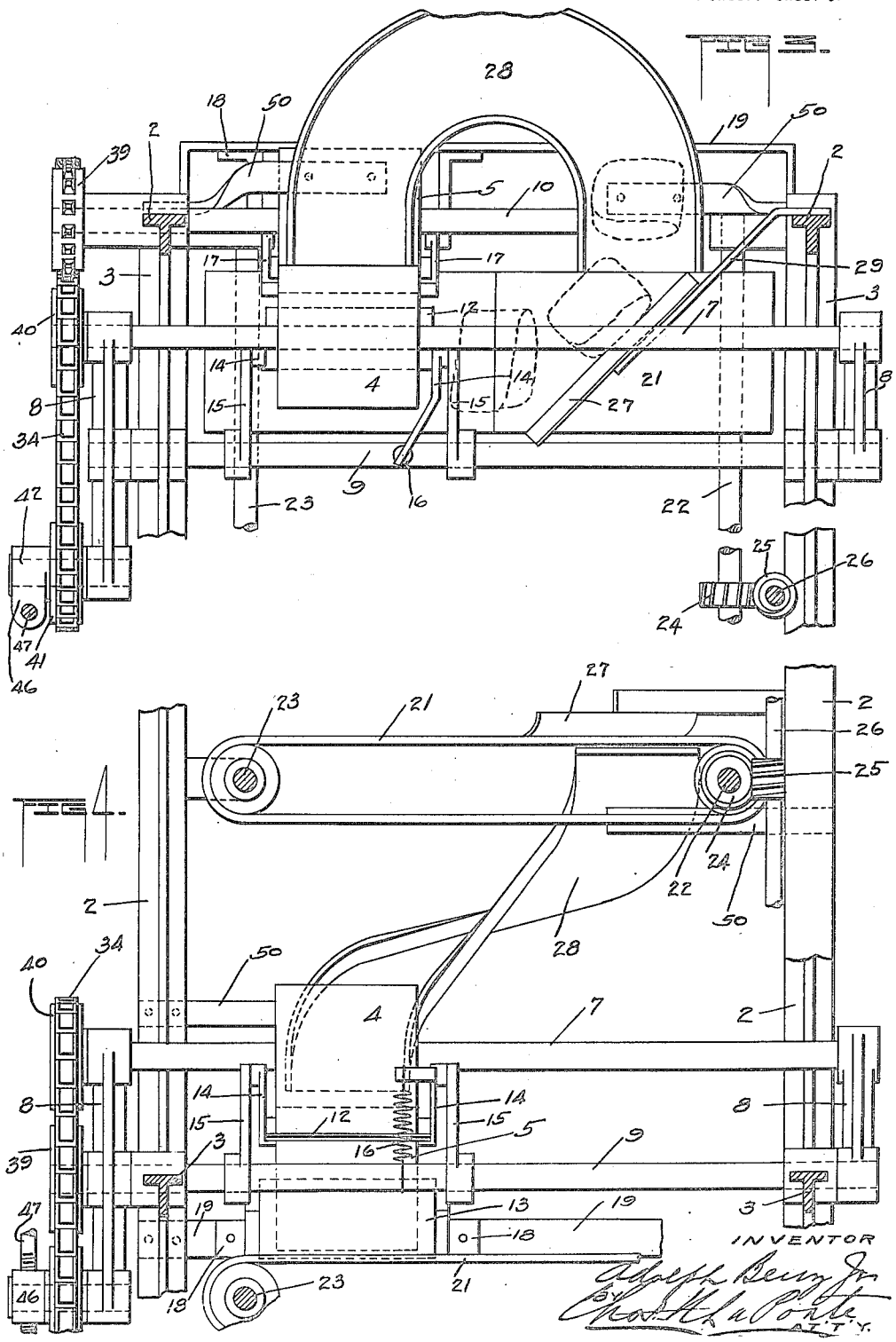

1,430,616

UNITED STATES PATENT OFFICE.

ADOLPH BENZ, JR., OF PEORIA, ILLINOIS.

APPARATUS FOR TREATMENT OF DOUGH.

Application filed June 16, 1920, Serial No. 389,268. Renewed January 16, 1922. Serial No. 529,746.

*To all whom it may concern:*

Be it known that I, ADOLPH BENZ, Jr., a citizen of the United States, a resident of Peoria, in the county of Peoria and State of Illinois, have invented new and useful Improvements in Apparatus for Treatment of Dough, of which the following is a specification.

This invention has reference to an apparatus for the treatment of dough, and is designed to carry out the method described in a companion application filed of even date herewith, bearing Serial Number 398,267 and patented February 22, 1921, No. 1,369,724.

The invention has for its principal object to enable mechanical means to be employed for conditioning the gluten of the dough after the dough has been divided into loaf units by a "divider" or "scaling" machine; whereby, the period of fermentation is decreased, the gluten effectively stretched and the dough returned to that condition of elasticity, or nearly so, it was in when removed from the fermentation troughs; thereby bringing the dough to its proper degree of maturity, in the least possible time, so as to avoid ageing at the cost of flavor. The resultant loaf will be larger in volume, whiter in color, better bloom of crust, better pile of loaf, smoother grain and better flavor than usual.

According to the present invention the loaf units received from the "divider" or "scaling" machine are subjected to a gentle rolling, folding, turning and stretching by mechanical means, including a series of sets of rollers, preferably superimposed one set of rollers above the other, and associated with each set of rollers transferring means, which preferably act to turn the loaf units between each rolling action, whereby the gluten is subjected to a thorough stretching action.

While I have illustrated a preferred arrangement of rollers and transferring means, it will be evident from the following description taken in connection with the accompanying drawings, that the number of sets of rollers employed may be varied according to the character of the dough worked, and that the transferring means may be modified to suit existing conditions.

In the drawings,

Figure 1 is a side elevation of a machine embodying my invention, parts being omitted for the sake of clearness;

Figure 2 is a front elevation of Figure 1;

Figure 3 is an enlarged cross-section in plan as the same would appear on the line 3—3 Figure 2, parts broken away;

Figure 4 is an enlarged detailed rear elevation, as the same would appear looking at those parts bounded by the dotted lines 4—4 Figure 1;

Figure 5 is an enlarged vertical cross-section showing two sets of rolls, and illustrating how the loaf units are folded and stretched and the means for transferring the loaf units between each set of rolls;

Figure 6 is a perspective view of a loaf unit as it appears after being subjected to a rolling, folding and stretching operation.

Like characters of reference denote corresponding parts throughout the figures.

My conditioning machine includes a suitable base 1 from which upstands the corner posts or standards 2, of which there are preferably four, and said corner posts or standards 2 are connected and braced by means of the cross-frames 3.

There are provided a series of sets of rollers 4 and 5, the said sets of rollers being preferably superimposed, one set of rollers above the other, the corresponding rollers of each set being preferably in the same vertical alinement, see Figures 1 and 5. In this instance I prefer to show the conditioning machine with at least four sets of rollers, although conditions of flour used may require the loaf units to be subjected to the action of more than four sets of these rollers, before the gluten has been stretched enough to obtain the desired result, and I, therefore want it understood that no limitation is placed on the use of only four sets of rollers, and that more or less may be used when occasion requires. The rollers 4 are provided preferably with fluted, serrated or roughened surfaces 6, and said rollers are carried by spindles 7 journaled in arms 8 secured on rockable rods 9 which is for the purpose of adjusting the rollers 4 relatively to the rollers 5, and thereby contract or widen the space between said rollers to regulate the pressure on the dough acted upon by the rollers. The rollers 5 are carried on spindles 10 preferably journaled in certain of the supports or standards 2 and the surfaces of these rollers are preferably smooth.

Coacting with the respective rollers 4 and 5 are scraping blades 12 and 13, which insure the release of the dough constituting the loaf units as such units pass down between the rollers. The scraper 12 is shown attached to arms 14 having a pivotal connection with other arms 15 secured to the rods 9, and springs 16, connected one end to the arms 14 and their other ends secured to rods 9 yieldingly hold the scraping blades 12 in coacting relation with the surface of the roller 4. The scraper 13 is shown attached to arms 17 having a pivotal connection with other arms 18 secured to frames 19 attached to and projecting from certain of the supports 2, and springs 20, connected one end to the arms 17 and their other ends secured to the frames 19 yieldingly hold the scraping blades 13 in coacting relation with the surface of the roller 5.

The loaf units, as they are acted upon by the respective sets of rollers 4 and 5 are received upon, preferably, cross belt conveyors 21, carried by the cross-shafts 22 and 23. Power is imparted to the shafts 22 to operate said cross-conveyors through worm wheels 24 on the shafts 22 which mesh with worms 25 carried on an upright driving shaft 26.

In Figure 6 one of the loaf units is shown in perspective to illustrate how each unit is folded upon itself as it is received from between the rollers 4 and 5 upon a movable cross-conveyor 21. Said loaf units are received successively by each cross conveyor, conveyed a suitable distance and then by means of the scrapers or wipers 27 are caused to be discharged or removed from the cross-conveyor and received by a chute 28, which will transfer the said folded loaf units by gravity in position to be received by and enter between the next succeeding pair of rollers 4 and 5, which will act upon the loaf units in the same manner as the preceding rollers 4 and 5, received upon a belt conveyor, again discharged into a chute to pass through a corresponding rolling, folding and stretching, as that just preceding. This operation continues from the top of the conditioning machine to the bottom, each loaf unit being acted upon by the succeeding sets of rollers 4 and 5, until the loaf units reach the lower end of the conditioning machine, when they are discharged, preparatory to the action of a "molding" machine.

The scrapers or wipers 27 preferably lie obliquely across the path of travel of the conveyors 21, see Figure 3 and are secured to and supported by brace arms 29 secured to one of the supports 2. The position and angularity of these scrapers or wipers 27, is such that when the folded loaf units are received by the chutes 28, they have been turned part way round and are so received and passed through the next succeeding set of rollers 4 and 5, and if four sets of rollers 4 and 5 are employed in a conditioning machine, it is apparent that the said loaf units will be caused to make one or more complete turn from the top to the bottom of the machine, and if eight sets of such rollers should be employed, which may be found to be desirable, the said loaf units during the action of the conditioning machine will have made two or more complete turns from the top to the bottom of the machine. It should be apparent from the foregoing description that as a result of the successive operations of the sets of rollers 4 and 5, the loaf units are rolled, folded and stretched, first in one direction, then in another, resulting in a complete and thorough kneading of the dough constituting the said loaf units, stretching the gluten and delivering the said loaf units at the bottom of the machine in a state of elasticity, which is equal to, if not better, than when the dough was received by and divided into loaf units by the "divider" or "scaling" machine.

The shaft 26 may receive its power in any suitable manner and from any suitable source, but I have here shown it, geared to a main driving shaft 30, see Figures 1 and 2, and on said main driving shaft is carried a pulley 31 connected by a belt 32 with a source of power. There is also carried on the said shaft, a sprocket wheel 33 which drives a sprocket chain 34 employed to transmit rotational movement to the series of sets of rollers 4 and 5. This is accomplished as follows: The sprocket chain 34 at the upper end of the machine passes over an idler sprocket wheel 35 journaled on a short shaft 36, and said sprocket chain crosses over the top of the machine, passing over an idler sprocket wheel 37 journaled on a short shaft 38, and from said idler sprocket wheel 37 the chain passes down and around a sprocket wheel 39 on the upper roller shaft 10, thence up and over a sprocket wheel 40 journaled on the upper roller shaft 7, and from there the sprocket chain passes down and around an idler sprocket wheel 41 carried by a spindle 42 journaled in the lower end of the upper arm 8 and there the chain passes over an idler sprocket wheel 43 carried by a spindle journaled in an arm extension 8ª of the upper arm 8, and from this idler sprocket wheel, the chain passes around an idler sprocket wheel 44 carried by a spindle journaled in an arm 45 connected with the main frame, and from this idler sprocket wheel 44, the said chain passes down and around a sprocket wheel 39 on the next lowest roller shaft 10, and up and over a sprocket wheel 40 on the next lowest roller shaft 7, and is then directed over similar idler sprocket wheels to those just previously described to direct and guide the sprocket chain to the next lowest set of roller shafts. It seems unnecessary to repeat the description of the driving and guiding means for the sprocket chain 34 in connection with each of the succeeding sets of rollers 4 and 5 and their respective shafts 7 and 10, as they are duplicates in every respect, except at the bottom of the machine, the sprocket chain passes from the idler sprocket wheel 43 to the driving sprocket 33, see Figure 1. The arrangement just described for guiding the chain 34 from one set of sprocket wheels 39 and 40 to the next succeeding set and so on, is first for the purpose of imparting the proper rotational movement to the rollers 4 and 5. The rollers 4 rotate in an anti-clockwise direction and the rollers 5 rotate in a clockwise direction and impart movement to the dough constituting the loaf units, in a manner best seen in Figure 5, the said loaf units being received by the cross-conveyors 21 and folded in the manner shown in Figure 6.

The corrugating, serrating or roughening surfaces of the rollers 4, as will be understood, is to insure the gripping of the dough to carry the loaf units between the rollers, and the speed at which the cross-conveyors 21 travel relatively to the rotation of the rollers 4 and 5, is such that the loaf units will fold upon themselves, substantially in the manner shown in Figure 6, where a loaf unit is shown folded upon itself. This result I have obtained by having the surface of the rollers moving approximately twelve times as fast as the surface of the conveyor belts. The passage of the loaf units through the conditioning machine occupies a comparatively short space of time, and as a result of the action of the rollers and the cross-conveyors which roll, fold and stretch the dough, the gluten is brought to a proper maturity and with a lesser degree of fermentation.

The other reason for so guiding the sprocket chain 34 is to provide for the non-disturbance of the driving relation of said chain with the roller shafts 7 and 10 when the arms 8 are oscillated for the purpose of moving the rollers 4 toward or from the rollers 5. As previously stated, the shafts 9 are rockable shafts and the lower ends of the arms 8 connected thereto, have a pivotal connection with threaded nuts 46 through which passes the vertically disposed rod or stem 47 which has a threaded relation with the said nuts. The upper end of the rod or stem 47 has connected thereto, a crank 48 for the manual operation of the rod or stem 47, which when turned, will impart up or down movement to the nuts 46, as the case may be, which will in turn, oscillate the respective arms 8 and swing the rollers 4 to or from the rollers 5, as will be understood.

The sprocket wheels 40, 41 and 43, as will be understood, oscillate with the arms 8 and therefore the chain 34, and its relation to the said sprocket wheels is not disturbed.

In Figure 1, a conveyor A is shown, which is intended to receive the loaf units from the "divider" or "scaling" machine, and deliver the same to the conditioning machine at the upper end thereof, upon a chute 49, which will direct the loaf units down and in between the first set of rollers 4 and 5. After the loaf units have been acted upon by the last set of rollers 4 and 5 at the bottom of the machine, they are discharged by the lowest cross conveyor 21 on to a conveyor B shown in dotted lines in Figure 1, which will convey the folded loaf units to the loaf "molding" machine.

By reference to Figures 2, 3 and 4, the chutes 28 are preferably shown of a spiral formation, insuring the delivery of the loaf units from the cross conveyor 21 to the succeeding sets of rollers 4 and 5 in each instance arranged below the cross-conveyors, and to one side from the receiving end of the chutes. The said chutes are supported and braced by means of the arms or bars 50.

In the treatment of dough when making bread, the batch is mixed in a suitable mixing machine and then transferred to fermenting troughs. After the proper period of fermentation, the dough is passed through a "divider" or "scaling" machine, where the dough is divided into loaf units. The action of this last mentioned machine, when cutting the dough into loaf units, necessarily compresses the dough. Such compression causes the gluten to get "set back" or in other words, returned into a snarled, ragged or jammed and non-elastic state. Furthermore, when the dough is compressed, the starches become embedded in the gluten and binds it. This prevents proper expansion of the gases in the loaf and will also produce thick walled cells, preventing the starch grains from bursting and expanding, resulting in a loaf which is small, dark and honey-combed. To overcome the action of the "divider" or "scaling" machine, it has been the practice of bakers to subject the loaf units to what is termed a "balling" and proofing." The object of the "baller" is to dry the loaf units, roll the same into balls and form a skin or tissue over the outside to retain the fermentation gases. From the "baller" the loaf units are passed to the "proofer" where they are given a period of rest, and during such period of rest, new gases are formed which are intended to expand and separate the starches and gluten, with the idea that the dough will return to the elastic state it was in before being placed in the "divider" or nearly so, and thereby overcome the compressing action of the "divider."

It is a known fact, however, that the action of the "proofer" does not accomplish the stretching of the gluten as effectively as is necessary to return the same to the elastic state it was in when it entered the "divider," and due to the fact that the "proofer" is of comparatively long duration, the fermentation period is increased, which is undesirable, and the dough is aged at the expense of the flavor.

My conditioning machine, herein described, takes the place of the "baller" and "proofer," thereby decreasing the period of fermentation and also the unnecessary ageing of the dough. As shown, this conditioning machine will break, roll, fold and stretch the dough a multiplicity of times, whereby all the innermost particles of gluten are given a gentle rolling, folding and turning and stretching, and thereby bring the dough to the proper degree of maturity, in the least possible time, so as to avoid ageing, at the cost of the flavor.

It is believed that the operation of the machine and the function of the various parts, will be understood without any further detailed description of the operation, and while I have elected to show a preferred form of structure by means of which the dough may be treated, to obtain the best possible results, it should be apparent that various modifications might be made in the detailed construction of the various parts, without departing from the spirit and scope of the invention.

What I claim is:—

1. An apparatus for conditioning the gluten of fermented dough in loaf units, including means for sheeting each dough unit, means acting in conjunction with said sheeting means to fold said sheeted units once upon themselves to uniformly build up sheets of gluten tissues, and other and similar sheeting and folding means, whereby the dough units are sheeted and folded once upon themselves a plurality of times.

2. An apparatus for conditioning the gluten of fermented dough in loaf units, including a set of coacting rollers for rolling each dough unit into a strip, a moving element arranged to receive each strip of dough which folds upon itself with a single fold as the strip is discharged by said rollers on to said element, to uniformly build up sheets of gluten tissues, and other sets of rollers and moving elements, adapted to receive and act progressively upon said loaf units to roll and fold such units a plurality of times.

3. An apparatus for conditioning the gluten of fermented dough in loaf units, including a plurality of sets of rollers, each set of rollers acting progressively to roll each loaf unit into a strip, and means interposed between each set of rollers which is adapted to receive each unit strip and transfer it from one set of rollers to the next, turning the same in its length during each transfer movement, the relative speed of such transfer means and said rollers being such that as the strips are received from the rollers by said transfer means, said strips are folded once upon themselves.

4. An apparatus for conditioning the gluten of dough in loaf units, comprising a plurality of sets of rollers, and conveyors to transfer said units between said sets of rollers, the arrangement and speed of travel of said conveyors being such that the units as they are received by said conveyors are folded once upon themselves.

5. An apparatus for conditioning the gluten of dough in loaf units, comprising a plurality of superimposed sets of rollers, laterally movable conveyors arranged between each set of rollers, and chutes interposed between said sets of rollers and conveyors to deliver the dough units from the conveyors to the rollers.

6. An apparatus for conditioning the gluten of dough in loaf units, comprising a plurality of superimposed sets of rollers, laterally movable conveyors arranged between each set of rollers, chutes to receive the dough units from the conveyors and convey said dough units to the next succeeding set of rollers, and means for wiping said dough units off of the conveyors into said chutes and turning the dough units as they are discharged from said conveyors.

7. An apparatus for conditioning the gluten of dough in loaf units, comprising a plurality of superimposed sets of rollers, scrapers coacting with each of said rollers, and means associated with and acting in conjunction with each set of rollers to receive each unit, fold the same by a single fold and transfer the folded unit from one set of rollers to the next.

In witness whereof, I have hereunto affixed my hand this 12th day of June, 1920.

ADOLPH BENZ, JR.